United States Patent [19]

Numata

[11] Patent Number: 4,845,584

[45] Date of Patent: Jul. 4, 1989

[54] TRANSISTOR PROTECTIVE CIRCUIT

[75] Inventor: Hidetaka Numata, Furukawa, Japan

[73] Assignee: Alps Electric Co., Ltd., Japan

[21] Appl. No.: 193,189

[22] Filed: May 10, 1988

Related U.S. Application Data

[63] Continuation of Ser. No. 902,753, Sep. 2, 1986, abandoned.

[30] Foreign Application Priority Data

Sep. 6, 1985 [JP] Japan ........ 60-198062

[51] Int. Cl.[4] ........ H02H 3/087

[52] U.S. Cl. ........ 361/57; 361/18; 361/101

[58] Field of Search ........ 361/18, 56, 57, 91, 361/93, 94, 96, 98, 100, 101, 54

[56] References Cited

U.S. PATENT DOCUMENTS 3,303,388 2/1967 Means ........ 361/18
3,668,545 6/1972 Recklinghausen ........ 361/57 X
4,424,544 1/1984 Chang et al. ........ 361/56
4,429,339 1/1984 Jaeschke et al. ........ 361/93
4,438,473 3/1984 Cawley et al. ........ 361/18
4,453,193 6/1984 Huang et al. ........ 361/98
4,713,719 12/1987 Kugelman ........ 361/54

FOREIGN PATENT DOCUMENTS 1300021 6/1962 France ........ 361/101

*Primary Examiner*—A. D. Pellinen
*Assistant Examiner*—H. L. Williams
*Attorney, Agent, or Firm*—Guy W. Shoup; Paul J. Winters; Brian D. Ogonowsky

[57] ABSTRACT

A transistor protective circuit includes a transistor transmitting a current to a load to drive same, and a switching element provided in a preceding stage of the transistor and responsive to an abnormal current in the load to turn off the transistor to protect it against destruction.

2 Claims, 3 Drawing Sheets

TRANSISTOR PROTECTIVE CIRCUIT

This is a continuation application from application Ser. No. 902,753, filed Sept. 2, 1986, now abandoned.

FIELD OF THE INVENTION

This invention relates to a transistor protective circuit, and more particularly to an improved transistor protective circuit protecting a transistor from destruction caused by an abnormal increase of a current in a load to be driven by the transistor.

BACKGROUND OF THE INVENTION

FIG. 5 shows a circuit in which a load is connected to the collector of a transistor. The collector of a load driving transistor 511 receives a voltage from a power source 515 via a load 513. The base of the transistor 511 receives an input voltage via a resistor 517.

If the load 513 is short-circuited for some reason, a great current will flow between the collector and emitter of the transistor 511 and destruct the transistor 511.

A countermeasure against such a destruction is to interpose a fuse in series with the load 513. However, the current interrupting time of the fuse upon an abnormal current is more than several seconds, and the circuit is not recovered by simply removing the cause of the short circuit, unless the blown fuse is replaced by a new fuse.

In a prior art circuit shown in FIG. 6, a resistor 611 is interposed between the emitter of the transistor 511 and the earth (common potential line) to prevent destruction of the driving transistor 511. When the load 513 is short-circuited, the voltage drop in the resistor 611 increases, but the current flowing in the transistor 511 is maintained substantially constant by a feedback to the base (fixed current circuit). However, the circuit invites a great increase of consumption in the transistor 511, and therefore requires a large-scaled heat sink or an extremely large-capacity transistor with respect to the capacitance of the load.

OBJECT OF THE INVENTION

It is therefore an object of the invention to provide a transistor protective circuit with a simple construction which not only reliably protects a transistor from destruction, but also recovers its operation by simply removing the cause of the short circuit in a load to be driven by the transistor.

SUMMARY OF THE INVENTION

According to the present invention, there is provided a transistor protective circuit comprising:

an input means applying an input signal to a first terminal of a transistor to be protected by said circuit;

a load and a power source connected in series between a second terminal of said transistor and a common potential line;

a detector element connected between a third terminal of said transistor and said common potential line; and a switching element connected between said first terminal of the transistor and said common potential line, and able to be latched in its on position.

DETAILED DESCRIPTION

Figure 1:
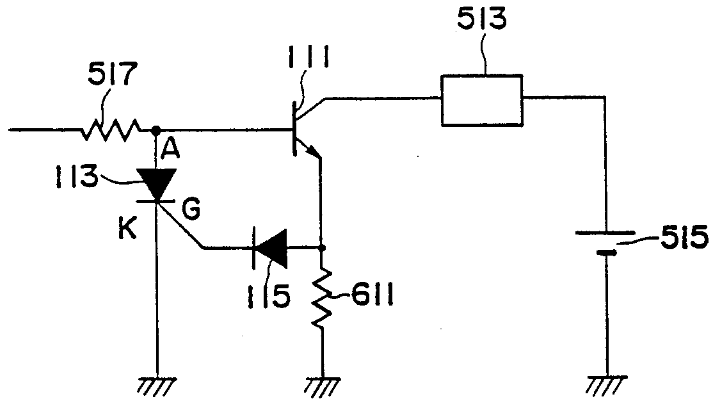
FIGS. 1 through 4 are circuit diagrams showing embodiments of the invention.

The invention is hereinbelow described in detail, referring to some embodiments illustrated in the drawings.

Figure 5:
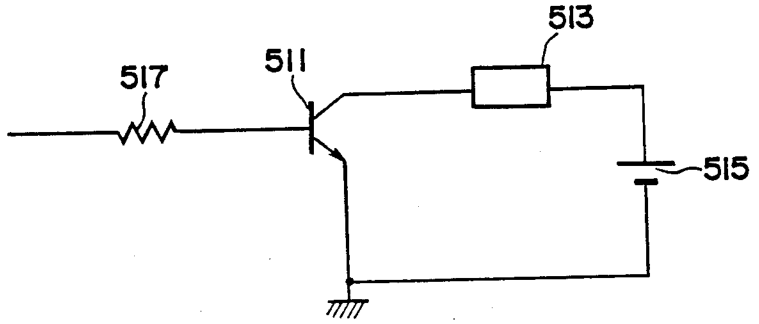
FIG. 5 PRIOR ART
FIGS. 5 and 6 are circuit diagrams for explanation of prior art arrangements.
Figure 6:
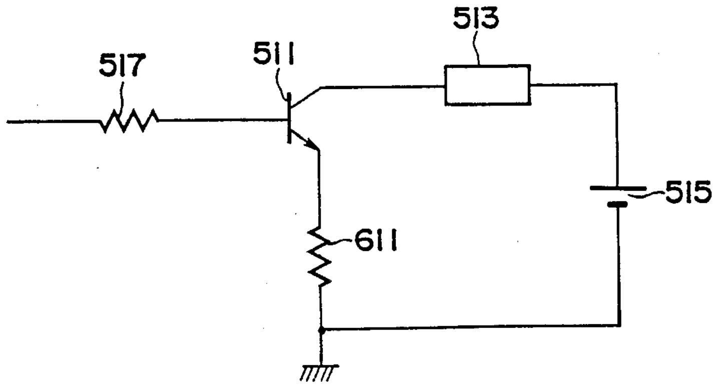
FIG. 6 PRIOR ART

FIG. 1 shows an embodiment of the present invention in which a bipolar NPN transistor is used as a load driving transistor 111. A thyristor 113 is interposed between the base of the transistor 111 and the earth, with to anode connected to the base and the cathode connected to the earth. Between the gate of the thyrister 113 and the emitter of the transistor 111 is interposed a diode 115, with the anode connected to the gate of the thyristor 113 and the cathode connected to the emitter of the transistor 111. The other parts or members in FIG. 1 are identical to those of FIGS. 5 and 6 designated by the same reference numerals, and they are not explained here.

The circuit having the aforegoing arrangement operates as follows.

In a normal operation of the circuit, an input voltage is entered in the base of the transistor 111 via the resistor 517, and the load 513 is activated by a current applied thereto responsively. In this case, the thyristor 113 is maintained in its off position.

In an abnormal condition, i.e. when the load 513 is short-circuited by some reason, a great current flows through the collector and emitter of the transistor 111 and the resistor 611. When the voltage at both ends of the resistor 611 exceeds the gate voltage of the thyristor 113 (the sum of the on-gate voltage of the thyristor 113 and the forward voltage of the diode 115), the thyristor 113 is ignited. Due to the switching of the thyristor 113 from its "off" to "on" position, the current which entered in the base of the transistor 111 flows in the thyristor 113. Therefore, the base current for maintaining conduction of the transistor 111 does not flow, and the transistor 111 becomes non conductive.

It should be noted that the operation establishing non-conduction of the transistor 111 requires a remarkably little time of several microseconds which never invites destruction of the transistor 111 nor significant heat increase of the resistor 611.

The diode 115 is adapted to block a current from the gate of the thyristor 113 to the resistor 611 after the thyristor 113 is ignited, so that the anode-gate voltage is never increased by the current from the gate of the thyristor 113 in its on position. Therefore, the anode-cathode voltage does not increase, and the base voltage of the transistor 111 never increases to a value for conduction of the transistor 111. After the cause of the short circuit is removed, the load 513 resumes its normal operation by once removing the input signal and thereafter applying it again.

Figure 2:
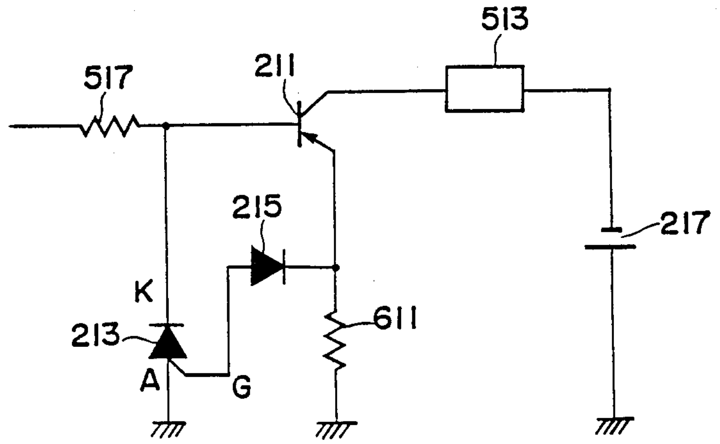

FIG. 2 shows a further embodiment of the invention which is simply different in polarity from the embodiment of FIG. 1. More specifically, a driving transistor 211 is a PNP transistor, the n-channel gate thyristor 213 (PUT) and the diode 215 are connected in the opposite polarity, and the power source 217 supplies a negative voltage.

Figure 3:
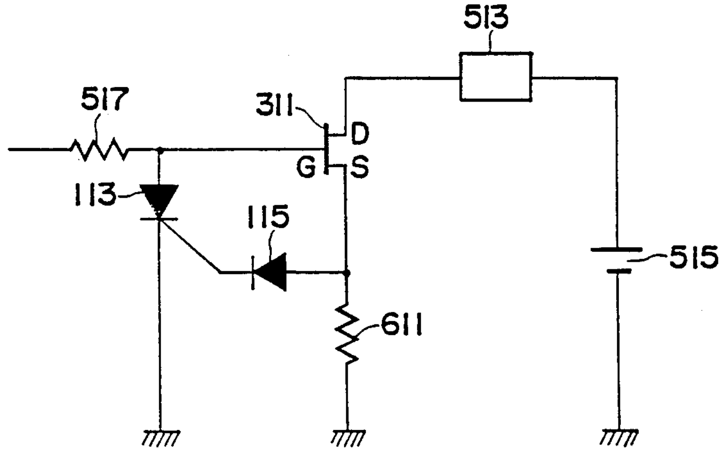

FIG. 3 shows a still further embodiment of the invention which is simply different from the embodiment of FIG. 1 in the use of the field-effect transistor 311 for driving the load.

Figure 4A:
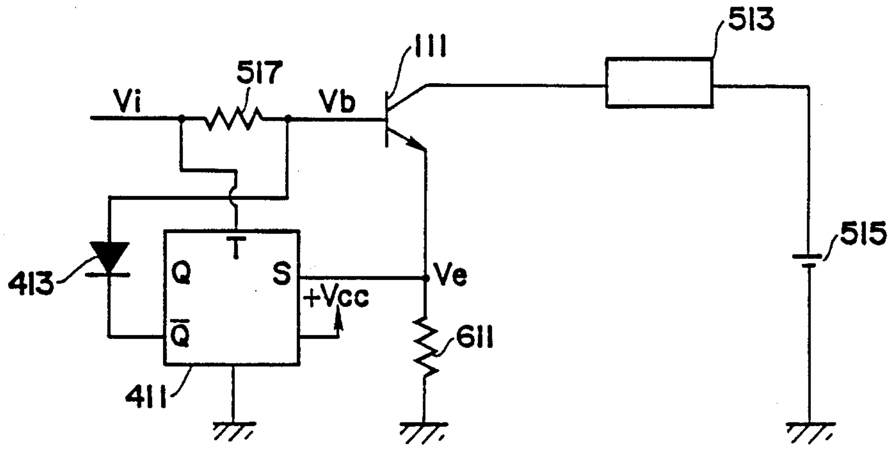
Figure 4A:
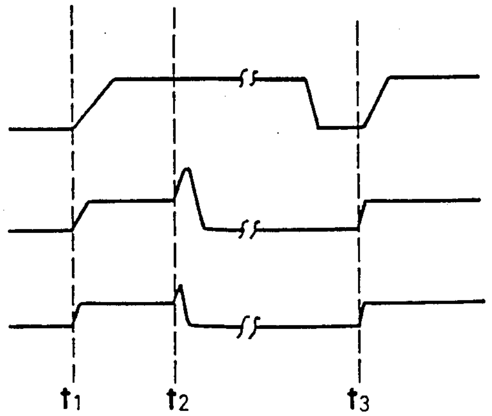

FIG. 4 shows a yet further embodiment of the invention which is simply different from the embodiment of FIG. 1 in the use of a flip-flop 411 instead of the thyristor as a switching element at an input stage of the circuit. As shown at (A) of FIG. 4, a T input terminal and an S input terminal of the flip-flop 411 are individually supplied with an input voltage $V_i$ and an emitter voltage $V_e$, and the diode 413 is connected between the base and the $\overline{Q}$ output terminal.

As shown by waveforms at (B) through (D) of FIG. 4, after the input voltage $V_i$ is entered (at the time $t_1$), if an abnormal current flows due to a short circuit in the load 513 (at the time $t_2$), the voltage at both ends of the resistor 611 (emitter voltage $V_e$) increases. Accordingly, the Flip-flop 411 (which is normally in its reset state) is changed to its set state to provide a $\overline{Q}$ output signal of "low" level. Therefore, conduction of the diode 413 is established, and the transistor is turned off, with no base bias applied thereto. The time $t_3$ shows that application of the input voltage $V_i$ is resumed at this time after the cause of the short circuit in the load is removed.

It is apparently possible to invert the polarity of the embodiment of FIG. 4 similarly to the case of FIG. 2.

As described, the invention provides a transistor protective circuit which never invites destruction of the load driving transistor due to an abnormal current flow in the load, nor requires replacement of any other member to resume its normal operation.

The embodiments of the invention in which an exclusive property or privilege is claimed are defined as follows:

1. A transistor protective circuit comprising:

a power source having an output side and a grounded side connected to ground for outputting a DC electrical current;

a load device having one of its two terminals connected directly to said output side of said power source;

a transistor having one main terminal connected to the other terminal of said load device and another main terminal connected to ground, and having an input terminal for receiving an attenuated input signal rendering said transistor conductive across its main terminals in accordance therewith for conducting a load current through said load device supplied from said power source;

a current detecting means connected between said other main terminal of said transistor and ground for providing a current level signal representing the load current supplied from said power source through said load device and through said transistor when rendered conductive;

an input signal supplying means which is separate from and not connected to said power source for supplying an attenuated input signal to said input terminal of said transistor corresponding to a desired load current to be supplied through said load device;

an input signal attenuating means having one terminal coupled to said input terminal of said transistor and another terminal coupled to said input signal supplying means;

a flip flop circuit having a set terminal connected to said current detecting means for switching said flip flop circuit in a shunt mode when a voltage exceeding a predetermined gate voltage is applied thereto, said flip flop circuit having shunt terminals connected between said input terminal of said transistor and ground and acting as a switching means for shunting the attenuated input signal to ground when the current level signal provided by said current detecting means exceeds a predetermined level, thereby rendering said transistor nonconductive; and said flip flop further having a separate reset terminal thereof connected to said input signal supplying means for resetting said flip flop upon momentary removal of said attenuated input signal after operation of said flip flop in the shunt mode.

2. A transistor protective circuit according to claim 1, wherein said transistor is of the bi-polar or uni-polar type.

* * * * *